United States Patent [19]

Schuster

[11] 4,417,013
[45] * Nov. 22, 1983

[54] PIGMENT COMPOSITIONS CONTAINING ACRYLATE COPOLYMERS

[75] Inventor: Johann Schuster, Basel, Switzerland

[73] Assignee: Sandoz Ltd., Basel, Switzerland

[*] Notice: The portion of the term of this patent subsequent to Apr. 20, 1999 has been disclaimed.

[21] Appl. No.: 339,870

[22] Filed: Jan. 18, 1982

Related U.S. Application Data

[62] Division of Ser. No. 155,766, Jun. 2, 1980, Pat. No. 4,325,862.

[51] Int. Cl.$^3$ .................. C08J 3/20; C08L 33/06; C09B 67/00; C09C 3/10
[52] U.S. Cl. ........................... 524/87; 524/88; 524/90; 524/92; 524/94; 524/96; 524/97; 524/190; 524/255; 524/327; 524/413; 524/431; 524/553; 524/548; 524/555
[58] Field of Search .................. 524/553, 555, 548, 87, 524/88, 94, 96, 97, 90, 92, 190, 431, 413, 327, 255, 482

[56] References Cited

U.S. PATENT DOCUMENTS

| | | | |
|---|---|---|---|
| 3,681,298 | 8/1972 | Hurwitz | 260/30.6 R |
| 3,900,438 | 8/1975 | Zdanowski et al. | 524/565 |
| 4,036,766 | 7/1977 | Yamamoto et al. | 524/555 |
| 4,061,844 | 12/1977 | Itoth et al. | 526/312 |
| 4,154,621 | 5/1979 | Burke et al. | 260/42.14 |
| 4,325,862 | 4/1982 | Schuster | 524/555 |

FOREIGN PATENT DOCUMENTS

| | | |
|---|---|---|
| 1178839 | 1/1970 | United Kingdom . |
| 1210056 | 10/1970 | United Kingdom . |
| 1429397 | 3/1976 | United Kingdom . |

*Primary Examiner*—Melvyn I. Marquis
*Assistant Examiner*—Herbert J. Lilling
*Attorney, Agent, or Firm*—Gerald D. Sharkin; Richard E. Vila; Thomas C. Doyle

[57] ABSTRACT

A solid pigment composition comprises an intimate mixture of a pigment and a copolymer of an alkyl or cycloalkyl methacrylate ester and a lesser amount of an aminoalkyl methacrylate ester. The compositions are compatible with a wide range of substrates such as paints, printing inks and bulk polymers.

27 Claims, No Drawings

PIGMENT COMPOSITIONS CONTAINING ACRYLATE COPOLYMERS

This is a division of application Ser. No. 155,766 filed June 2, 1980, now U.S. Pat. No. 4,325,862.

The invention relates to solid pigment compositions comprising a mixture of a pigment and a thermoplastic resin. Such compositions may be used to incorporate pigment into substrates such as paints, printing inks and bulk polymers, and enable the pigment to be more evenly dispersed in the substrate than if the pigment alone were to be added to the substrate.

The present invention provides a solid pigment composition comprising an intimate mixture of a pigment and a copolymer of a compound of formula I

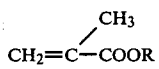

in which R is $C_{4-6}$ alkyl or $C_{4-6}$ cycloalkyl and a lesser amount of a compound of formula II,

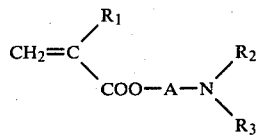

in which
$R_1$ is hydrogen or methyl,
$R_2$ is hydrogen or $C_{1-6}$ alkyl
$R_3$ is $C_{1-6}$ alkyl
or
$R_2$ and $R_3$ together with the nitrogen atom to which they are attached form a heterocyclic 5- or 6-membered ring which may contain an oxygen or a further nitrogen atom
and
A is a straight or branched chain $C_{2-6}$ alkylene group.

All alkyl groups of more than 2 carbon atoms may be either straight-chain or branched. In the compound of formula I, R is preferably a butyl or cyclohexyl group. More preferably the compound of formula I is isobutyl methacrylate. In the compound of formula II, $R_1$ is preferably methyl, and $R_2$ and $R_3$ as alkyl are preferably $C_{1-4}$ alkyl, more preferably methyl. Where $R_2$ and $R_3$ together with the nitrogen atom to which they are attached form a heterocyclic ring, this is preferably a morpholine or piperidine ring. Most preferably, both $R_2$ and $R_3$ are methyl. The group A is preferably $-CH_2-CH_2-$ or $-CH_2-C(CH_3)_2-CH_2-$. The preferred compound of formula II is 2-dimethylaminoethyl methacrylate.

The copolymer suitably has a reduced viscosity, as herein defined, of 5-25 ml/g, corresponding approximately to an average molecular weight of 10,000 to 80,000, and a $T\lambda_{max}$ temperature, as herein defined, above 45° C.

One suitable class of copolymers have a molecular weight of 15,000 to 25,000, a melting point range of 80°-120° C., preferably 92°-100° C. and an acid number of 0. The weight percentage of comonomer II in the copolymer is preferably 1-10%, more preferably 2-6%, particularly 3%.

The copolymer may also contain up to 10% by weight of one or more additional comonomers capable of free-radical polymerisation, for example vinyl-substituted heterocyclic compounds such as vinylpyridine, vinylimidazole and vinylpyrrolidone; vinyl esters of fatty acids, for example vinyl acetate; vinyl halides, for example vinylidenechloride; vinyl aromatics, for example styrene and vinyltoluene; α-olefins and/or dienes. The amount of any additional comonomer which is present should not be so great as to adversely affect the desirable properties of the final pigment preparation, such as its capability of being ground to a fine powder and its compatibility with a wide range of substrates. Preferably, the weight percentage of any additional comonomer present is no greater than the weight percentage of the comonomer of formula II, and more preferably only comonomers of formulae I and II are present.

The reduced viscosity of a polymer, $(\eta sp/c)$, is the specific viscosity $\eta sp$ of a polymer solution divided by the concentration of the solution. The specific viscosity is given by $$\eta sp = (t - t_o)/t_o$$

where t is the time required for a polymer solution to flow through a capillary viscometer at a given temperature and $t_o$ is the time required for the pure solvent at the same temperature. Although $(\eta sp/c)$ is not independent of concentration, it is relatively constant at low concentrations, where $\eta sp = 0.1$ to 0.2.

The temperature $T\lambda_{max}$ is the temperature of maximum vibrational damping of the polymer as measured by D.I.N. (Deutsche Industrienorm) 53445 or I.S.O. DR 533.

The copolymer may be prepared by conventional addition polymerisation methods, using an initiator such as a peroxide or an azo compound in the proportion of 0.05% to 1% by weight. A suitable initiator is 2,2'-azobis(isobutyronitrile). The polymerisation is carried out in the presence of a chain transfer agent to keep the molecular weight of the copolymer low. Suitable chain transfer agents are mercapto compounds such as 2-mercaptoethanol, used in quantities of up to 2% by weight. A suitable polymerisation process is to seal the mixture of monomers, initiator and chain transfer agent into a flat bag or tube of plastic film and to heat this container in a water bath, for example at 50°-100° C. The high surface-to-volume ratio of such a container gives good heat transfer and prevents overheating of the reaction mixture during polymerisation. When polymerisation is complete, the product may be removed from the container and milled to give a granulate or powder.

The intimate mixture of pigment and copolymer is obtained in conventional manner by melt blending or by dissolving the copolymer in a suitable solvent, adding the pigment and removing the solvent by evaporation. The pigment composition according to the invention may contain from 10 to 95% by weight of pigment, preferably 30-60% pigment.

Compositions containing relatively small amounts of pigment are suitably prepared by melt blending in appropriate equipment for example a kneader, roll mill or extruder, and will consist of a continuous matrix of copolymer containing a dispersion of pigment particles. If melt blending is carried out in a roll mill or kneader, the molten mass may be extruded and granulated, or may be allowed to solidify and then ground to a powder.

Alternatively, the pigment may be dispersed in a solution of the copolymer in a suitable solvent, for example in a sand or ball mill, or a blender. The solution may then be dried directly, or a pigment-solvent suspension may be precipitated with water, filtered and dried. Solution techniques may be necessary in order to prepare compositions having high pigment content; according to the pigment content the compositions may consist of a dispersion of pigment particles in a more or less continuous copolymer matrix, or of pigment particles or clumps of particles coated with copolymer.

The pigment composition according to the invention may contain inorganic pigments for example titanium dioxide, iron oxide, chromium oxide and lead chromate or organic pigments, for example those of the azo-, bisazo-, phthalocyanine-, naphthol AS-, benzidine-, isoindolinone-, quinacridone-, dioxazine-, thioindigo- and perylene-types. Mixtures of pigments of one or more types may be used. Essentially all pigments capable of being used for the mass dyeing of polymer substrates may be used in the present pigment compositions.

In addition to pigments the composition may contain other solid additives, for example fillers such as calcium carbonate or silica.

The pigment compositions of the present invention are compatible with a very wide range of polymers, may be easily incorporated into different types of substrates, and give notably high colour yields in the final products.

The following examples, in which all parts are by weight and all temperatures in degrees Centigrade, illustrate the invention:

Preparation of Copolymer

Copolymer 1

A mixtute of 97 parts isobutyl methacrylate, 3 parts dimethylaminoethyl methacrylate, 0.2 parts azoisobutyronitrile (AIBN) and 1.3 parts 2-mercaptoethanol is polymerised in a tube of plastic film in a water bath at 50° for 24 hours. The solid product is cured at 100° for 8 hours to reduce the residual monomer content. The polymer had a reduced viscosity (measured at 20° in chloroform) of 8 cm$^3$/g.

Copolymer 2

A mixture of 90 parts cyclohexyl methacrylate, 10 parts dimethylaminoethyl methacrylate 0.1 parts AIBN and 1.8 parts 2-mercaptoethanol is polymerised and cured as described for copolymer 1 above. The product had a reduced viscosity of 7 cm$^3$/g.

Copolymer 3

A mixture of 96 parts isobutyl methacrylate, 4 parts 2-(4-morpholinyl)ethyl methacrylate, 0.1 part AIBN and 1.6 parts 2-mercaptoethanol is polymerised as described for copolymer 1 above. The produce had a reduced viscosity of 8 cm$^3$/g.

Copolymer 4

A mixture of 89 parts cyclohexyl methacrylate, 1 part methacrylic acid, 10 parts dimethylaminoethyl methacrylate, 0.1 part AIBN and 2.0 parts 2-mercaptoethanol is polymerised as described for copolymer 1. The product had a reduced viscosity of 6 cm$^3$/g.

PREPARATION OF PIGMENT COMPOSITION

EXAMPLE 1

50 Parts C.I. Pigment Blue 15:3 are blended with 50 parts of copolymer 1 in a Turbula mixer for 1 hour. The blend is then fed to a mixing extruder at 110°, and the extrudate coarsely granulated then finely ground in a Kolloplex mill.

The product is a 50% pigment composition in powder form, which is very easily incorporated into paints and printing inks and is suitable for the mass dyeing of polyacrylonitrile, polystyrene, ABS, styrene/acrylonitrile polymers, PVC and polyolefins.

EXAMPLES 2-4

Copolymer 1 in Example 1 is replaced by copolymers 2-4.

EXAMPLE 5

30 Parts C.I. Pigment Violet 23 and 70 parts of copolymer 1 are blended in a Turbula mixer for 1 hour, and worked up as described in Example 1 to give a pigment composition containing 30% pigment, which is readily incorporable into the substrates described in Example 1.

EXAMPLES 6-8

Copolymer 1 in Example 4 is replaced by copolymers 2-4.

EXAMPLE 9

36 Parts C.I. Pigment Green 7 are stirred into a solution of 24 parts of copolymer 1 and 110 parts isobutanol and are ground in a horizontal ball mill until the pigment is completely dispersed. After that the solvent is eliminated by steam-distillation. The precipitate is washed, dried and if required pulverized in known manner. The product contains 60% pigment, which is readily incorporable into the substrates described in Example 1.

EXAMPLE 10

50 Parts C.I. Pigment Blue 15:3 are added to a solution of 50 parts copolymer 1 in 100 parts methyl ethyl ketone, and dispersed by mixing in a Dissolver. After removal of the solvent by evaporation, the residue is pulverized in a Kolloplex mill. The resulting pigment composition contains 50% pigment, can readily be incorporated into paints and printing inks using normal mixing equipment and can be used for mass dyeing of the substrates described in Example 1.

What is claimed is:

1. A pigment composition comprising an intimate mixture of a pigment and a preformed copolymer of a compound of formula I

in which

R is C$_{4-6}$alkyl or C$_{4-6}$cycloalkyl, a lesser amount of a compound of formula II

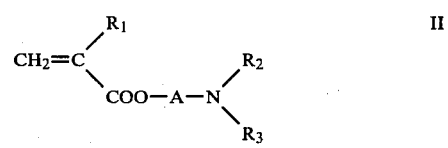

in which

R$_1$ is hydrogen or methyl,

R$_2$ is hydrogen or C$_{1-6}$alkyl, $R_3$ is $C_{1-6}$alkyl, or, $R_2$ and $R_3$ together with the nitrogen atom to which they are attached form a heterocyclic 5- or 6-membered ring which may contain an oxygen or a further nitrogen atom, and, A is a straight or branched chain $C_{2-6}$-alkylene group, and 0 to 10%, by weight, of comonomer other than compounds of formulae I and II, said copolymer being in molten form or dissolved in a suitable solvent.

2. A composition according to claim 1 wherein any comonomer other than the compounds of formulae I and II is a comonomer capable of free radical polymerization.

3. A composition according to claim 2 wherein any comonomer other than the compounds of formula I and II is vinylpyridine, vinylimidazole, vinylpyrrolidone, vinyl acetate, vinylidene chloride, styrene, vinyltoluene, an α olefin or a diene.

4. A composition according to claim 1 comprising a pigment and a solution of the copolymer in a suitable solvent.

5. A composition according to claim 4 wherein R in the compound of formula I is butyl or cyclohexyl.

6. A composition according to claim 4 in which the copolymer has a molecular weight of 15,000 to 25,000, a melting point range of 80° to 120° C. and an acid number of 0.

7. A composition according to claim 5 in which the copolymer has a reduced viscosity, as herein defined, of 5–25 ml/g, an average molecular weight of 10,000 to 80,000 and a $T_{max}$ temperature, as herein defined, above 45° C.

8. A composition according to claim 5 in which the weight percentage of comonomer of formula II in the copolymer is 1 to 10%.

9. A composition according to claim 6 in which the copolymer is a copolymer of isobutyl methacrylate and 2-dimethylaminoethyl methacrylate.

10. A composition according to claim 5 containing 30 to 60% by weight of pigment based on the weight of pigment and copolymer.

11. A composition according to claim 6 containing 30 to 60% by weight of pigment based on the weight of pigment and copolymer.

12. A composition according to claim 4 wherein the pigment is titanium dioxide, iron oxide, chromium oxide, lead chromate, or an azo, bisazo, phthalocyanine, naphthol As, benzidine, isoindolinone, quinacridone, dioxazine, thioindigo or perylene compound.

13. A composition according to claim 4 in which R in formula I is butyl or cyclohexyl.

14. A composition according to claim 4 in which, in formula II, $R_1$ is methyl; $R_2$ and $R_3$ are each methyl or together with the nitrogen atom to which they are attached, form a morpholine or piperidine ring, and A is $-CH_2-CH_2-$ or $-CH_2-C(CH_3)_2-CH_2-$.

15. A composition according to claim 14 in which the copolymer is a copolymer of isobutyl methacrylate and 2-dimethylaminoethyl methacrylate.

16. A composition according to claim 4 in which the copolymer is based on isobutyl methacrylate and has a molecular weight of 15,000 to 25,000, a melting point range of 80°–120° C. and an acid number of 0.

17. A composition according to claim 4 in which the copolymer contains from 1 to 10% by weight of the compound of formula II.

18. A composition according to claim 4 containing 30–60% by weight of pigment based on the weight of pigment and copolymer.

19. A composition according to claim 4 in which the copolymer has a reduced viscosity, as herein defined, of 5–25 ml/g, an average molecular weight of 10,000 to 80,000 and a $T_{max}$ temperature, as herein defined, above 45° C.

20. A composition according to claim 19 in which the weight percentage of comonomer of formula II in the copolymer is 1 to 10%.

21. A composition according to claim 19 in which the copolymer is a copolymer of isobutyl methacrylate and 2-dimethylaminoethyl methacrylate.

22. A composition according to claim 20 in which the copolymer is a copolymer of isobutyl methacrylate and 2-dimethylaminoethyl methacrylate.

23. A composition according to claim 20 containing 30 to 60% by weight of pigment based on the weight of pigment and copolymer.

24. A composition according to claim 22 containing 30 to 60% by weight of pigment based on the weight of pigment and copolymer.

25. A composition according to claim 23 wherein the pigment is titanium dioxide, iron oxide, chromium oxide, lead chromate, or an azo, bisazo, phthalocyanine, naphthol As, benzidine, isoindolinone, quinacridone, dioxazine, thioindigo or perylene compound.

26. A composition according to claims 1, 15, 17, 18, 5, 7, 8, 9 or 10 in which the copolymer is a copolymer of only compounds of formulae I and II.

27. A composition according to claims 1, 15, 17, 5, 8 or 12 containing from 10 to 95% by weight of pigment based on the weight of pigment and copolymer.

* * * * *